United States Patent Office 3,154,170
Patented Oct. 27, 1964

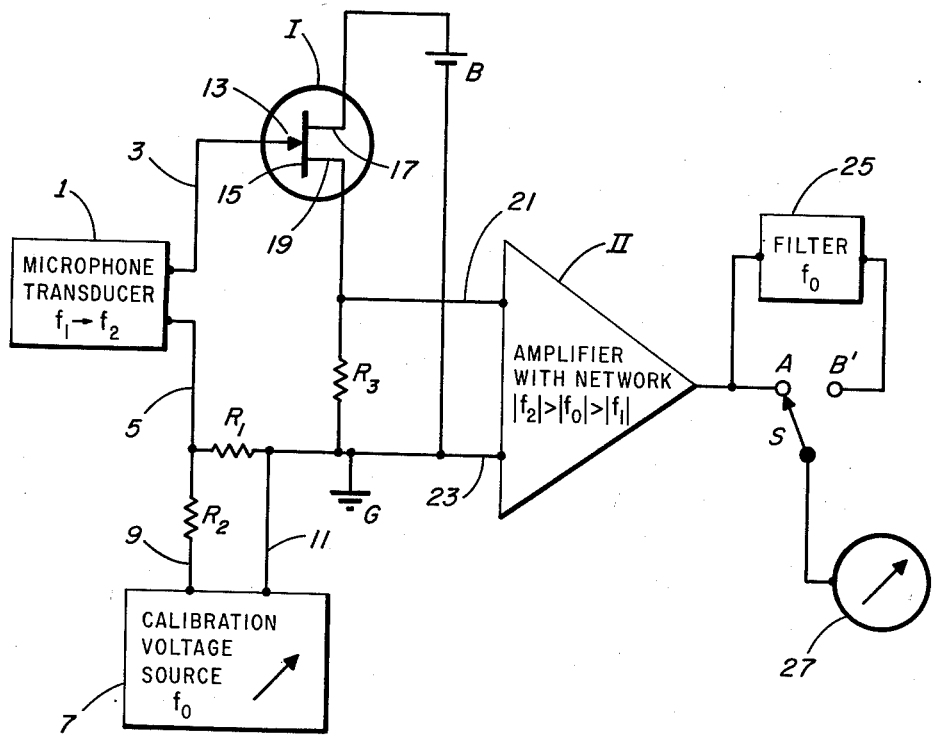
DENIS ULDERIC NOISEUX
INVENTOR.
BY Rines and Rines
ATTORNEYS.

3,154,170
METHOD OF AND APPARATUS FOR CALIBRATING VIBRATORY SIGNALS
Denis Ulderic Noiseux, Lexington, Mass., assignor to Bolt, Beranek & Newman, Inc., Cambridge, Mass., a corporation of Massachusetts
Filed Aug. 23, 1962, Ser. No. 219,001
7 Claims. (Cl. 181—.5)

The present invention relates to methods of and apparatus for measuring and calibrating vibratory signals, and, more specifically, to the calibration of acoustic-frequency signals.

The art is replete with various techniques and apparatus for measuring acoustic-frequency signal levels and relating the same to predetermined calibration standards. There are occasions, however, where it is desired continuously to monitor acoustic energy, for example, and to have a continual reference to a calibration signal that is subjected to the identical changes in the receiving and monitoring apparatus that the received acoustic-energy signals encounter.

It has previously been proposed, for example, periodically to calibrate the receiving apparatus with a calibration signal and then to make a measurement of the received acoustic-energy signal; but this technique is inaccurate and subject to serious disadvantages in that, during the time of measurement of the acoustic-energy signals, the receiving and measuring apparatus may become subjected to some instability or change; or such instability or change may occur during the interval of calibration, only. Another proposal, accordingly, has been simultaneously to inject into a microphone transducer, from opposite sides thereof, an acoustic calibration signal and the acoustic signals-to-be-monitored, thereby to provide for simultaneous calibration and received-signal measurements. In such instances, however, changes in atmospheric and other conditions on the two sides of the microphone introduce errors. Acoustic calibration equipment in the form of an acoustic horn or generator and coupling tube and the like is required, moreover, that is inherently temperature sensitive and thus subject to inaccuracies during operation. In addition, the calibration signal is injected into a different portion of the microphone apparatus than the signals-to-be-measured, so that any assymetrical changes in condition or performance of the microphone, as, for example, when an exposed surface thereof becomes wet, prevent accurate measurements.

It is accordingly an object of the present invention to provide a new and improved method of and apparatus for measuring and calibrating vibratory signals, such as acoustic signals and the like, that shall not be subject to any of the above-described disadvantages; but that shall, to the contrary, provide continual calibrating and signal-reception measurements absent the possibility of changes that do not simultaneously occur for both the calibrating and received signals.

A further object is to provide a new and improved calibrating transducing apparatus of more general utility.

Other and further objects will be explained hereinafter and will be more particularly pointed out in connection with the appended claims. In summary, however, from one aspect, the invention relates to a method of measuring and calibrating vibratory signals of a predetermined band of frequencies and of magnitude above a predetermined value, that comprises, transducing the vibratory signals into corresponding electrical signals, applying the electrical signals to an input of an amplifier system of predetermined noise level less than the said predetermined value, simultaneously and continually with such application injecting a calibration electric signal into the said input of magnitude of the said predetermined value and of frequency intermediate the said band, and monitoring the relative magnitudes of the calibration and electrically transduced vibratory signals in the output of the amplifier system. Preferred constructional details are hereinafter presented.

The invention will now be described in connection with the accompanying drawing, the single figure of which is a combined block and schematic circuit diagram illustrating the invention in preferred form.

A microphone transducer is schematically shown at 1, adapted to receive a predetermined band of acoustic-energy signals $f_1$ to $f_2$, such as, for example, a band of audible frequencies ranging from 20 c.p.s. up to 20 kc.s. Such a band is of importance in connection with, for example, the monitoring of annoyance signals such as those generated by aircraft engines, and related disturbances. Because of the greater annoyance of the upper frequencies, these have been weighted more heavily such that this band involves levels of the order of 18 db, in the neighborhood of 7 kc.s. above a reference level at 1 kc. per second, and minus 20 db in the lower region of 30 c.p.s. Clearly, any other acoustic-energy frequency bands that are to be measured may be employed, as may other types of vibratory-signal transducers than microphones, including accelerometers, strain gauges, pressure transducers, velocity gauges, and similar devices. For the particular annoyance problem above stated, however, not only is a microphone transducer that is responsive over the annoyance band required, but the microphone should have very stable characteristics. Suitable transducers for this purpose include, for example, ceramic microphones of high impedance of the order of megohms and above.

The microphone transducer 1 is connected to an input circuit 3, 5, of a first preamplifier stage illustrated in the preferred form of a field-effect transistor I, such as the type C620 series (Crystalonics, Inc.) or the types TIX 690, TIX 691 (Texas Instruments Inc.), having high input impedances.

The anode 17 of the transistor stage I is shown connected through a potential source, schematically illustrated as a battery B, to a ground terminal G. The cathode 19 of the stage I is returned to the ground terminal G through a resistor R3. The silicon crystal 15 of this type of transistor I is provided with an intermediate grid 13 which connects to the upper input-circuit conductor 3. The output circuit of the amplifier I is connected by conductors 21 and 23 to one or more further amplifier stages II. For the annoyance band purposes before discussed, the amplifier stages II or the circuits connected thereto will preferably embody networks that introduce the weighted type of response before discussed, the microphone transducer 1 having a substantially flat response over the band of interest. This is represented by the symbols $|f_2|>|f_0|>|f_1|$, meaning that the magnitude or level of higher frequencies $f_2$ is weighted more than the levels of intermediate frequencies $f_0$, which in turn is also weighted more than the levels of lowest frequency $f_1$.

In accordance with the present invention, a calibration signal of frequency $f_0$ is provided by an oscillator or other source 7 and is simultaneously and continually injected into the input circuit of the amplifier stage I by means of conductors 9 and 11. The conductor 9 connects through a first precision resistor R2 to the lower terminal of the microphone 1 and to the left-hand terminal of a second precision resistor R1, the right-hand terminal of which connects to the conductor 11 and is series-connected along the input-circuit conductor 5. Through the use of the precision resistors R1 and R2, a fixed magnitude of calibration signal may be applied to the input circuit, on the grounded side thereof in the illustrated example, with the microphone 1 thus completely maintained above ground potential. The magnitude of the calibration signal is adjusted at the calibration voltage source 7, as schematically illustrated by the arrow, to a value greater than the noise of the amplifier system and the background noise level of ambient sound-energy impinging upon the transducer 1, but is at a level less than the predetermined minimum level of acoustic-energy signal that it is desired to monitor. The frequency $f_0$ of the calibration signal is preferably intermediate the band $f_1$ through $f_2$ of signals-to-be-monitored, such as the 20 c./s. to 20 kc.s. signals before referred to. A calibration frequency of the order of 1 kc. may, for example, be employed.

At the output of the system, both the calibration and detected acoustic-energy signals may be monitored and their realtive magnitudes indicated on an indicator 27, such as a meter, graphic recorder, or any other indicating device, when a switch S is in its left-hand position A. If the indicating instrument 27 is linear, then the ratio of the relative magnitudes of the amplified calibration signal and received acoustic-energy signals will be indicated; whereas, if the indicating system is logarithmic, the difference between these signals will be indicated. In either event, a continually calibrated measurement of the received acoustic-energy signals is provided, with any instabilities or changes in the system automatically compensated for insofar as the calibration of the measured signals may be concerned, since all the signals travel through the same system, simultaneously.

In the event that it is desired to monitor the calibration signal alone, and, if desired, to employ a calibration signal that is more independent of the noise inherent in the system, a filter 25 of the narrow-band type, centered at the calibration-voltage frequency $f_0$ may be introduced between the output of the amplifier system and the indicating instrument 27, as by moving the switch S to position B'. In such position, the indicating member 27 provides an indication substantially exclusively of the calibration signal.

In the particular preferred apparatus above discussed, the field-effect transistor amplifier I is particularly useful with stable high-impedance microphones, and the transistor and its immediate circuitry are particularly stable. In view of the nature of the injected electrical calibration signal in the input circuit above-described, however, such stability of the transistor is not essential, although it is obviously preferred. Vacuum-tube amplifiers and ordinary transistors may obviously also be employed in accordance with the type of circuit and technique here involved with highly reliable results.

While the precision-resistor injection circuit, involving the series resistor R1, is preferred, with maintenance of the microphone 1 above ground potential, one could inject the electrical calibrating signal into the input circuit by other techniques. A transformer, the secondary winding of which is in series with the grid 13, may be employed for this purpose, or the calibration signal may be applied across the resistor R3. In such events, the transducer 1 may be grounded.

While the method and apparatus above-described have been discussed in connection with the important noise-measurement application, it is to be understood that this technique is also applicable for the measurement and calibration of other types of signals, including other types of vibratory signals than acoustic energy. Further modifications will also occur to those skilled in this art, and all such are considered to fall within the spirit and scope of the present invention as set forth in the appended claims.

What is claimed is:

1. A method of measuring and calibrating vibratory signals of a predetermined band of frequencies and of magnitude above a predetermined value, that comprises, transducing the vibratory signals into corresponding electrical signals, applying the electrical signals to the input of an amplifier system of predetermined noise level less than the said predetermined value, simultaneously and continually with such application injecting a calibration electric signal into the said input of magnitude of the said predetermined value and of frequency intermediate the said band, and monitoring the relative magnitudes of the calibration and electrically transduced vibratory signals in the output of the amplifier system.

2. Apparatus of the character described having, in combination, an amplifier system having an input and an output circuit and of predetermined noise level, a vibration transducer having a predetermined frequency band of response to vibratory signals of at least a predetermined magnitude and connected to the input circuit, electric-signal injecting means connected in the input circuit between the transducer and the amplifier system, a source of calibration electric signal of frequency intermediate the said band and of magnitude greater than the said predetermined noise level but less than the said predetermined magnitude and connected with the signal-injecting means continually to inject the calibration signal into the said input circuit, and means for monitoring the relative magnitudes of the calibration and electrically transduced vibratory signals in the output circuit of the amplifier system.

3. Apparatus as claimed in claim 2 and in which one side of the input circuit is grounded, the microphone is completely maintained at a potential above ground, and the signal-injecting means comprises precision resistor means connected in series with the input circuit.

4. Apparatus as claimed in claim 3 and in which the said resistor means is connected in the grounded side of the said input circuit.

5. Apparatus as claimed in claim 2 and in which means is provided between the said output circuit and the monitoring means for alternately applying to the monitoring means both the calibrating and transduced signals and the calibrating signal alone.

6. Apparatus of the character described having, in combination, an amplifier system comprising field-effect transistor means having an input and an output circuit and of predetermined noise level, a stable high-impedance microphone vibration transducer, having a predetermined frequency band of response to acoustic vibratory signals of at least a predetermined magnitude and connected to the input circuit, electric-signal injecting means connected in the input circuit between the transducer and the amplifier system, a source of calibration electric signal of frequency intermediate the said band and of magnitude greater than the said predetermined noise level but less than the said predetermined magnitude and connected with the signal-injecting means continually to inject the calibration signal into the said input circuit, and means for monitoring the relative magnitudes of the calibration and electrically transduced vibratory signals in the output circuit of the amplifier system.

7. Apparatus as claimed in claim 2 and in which network means is provided in advance of the monitoring means for weighting the high frequencies of the said band with respect to the low and middle frequencies thereof to provide higher and lower response, respectively, above and below the calibration signal frequency.

No references cited.